United States Patent

Reusche et al.

[11] Patent Number: 5,299,769
[45] Date of Patent: Apr. 5, 1994

[54] ADJUSTABLE MOUNTING ASSEMBLY

[75] Inventors: Thomas K. Reusche, Wayne; Donald W. Reusche, St. Charles; Donald B. Owen, Villa Park, all of Ill.

[73] Assignee: Allied Precision Industries, Inc., Geneva, Ill.

[21] Appl. No.: 823,125

[22] Filed: Jan. 21, 1992

[51] Int. Cl.⁵ ............................................. F16M 11/00
[52] U.S. Cl. .............................. 248/219.2; 248/231.4; 248/558; 24/490; 24/493; 24/517
[58] Field of Search ............... 248/231.4, 219.2, 316.4, 248/310, 231.6, 187, 558, 154; 24/490, 493, 517

[56] References Cited

U.S. PATENT DOCUMENTS

| | | | |
|---|---|---|---|
| 388,685 | 8/1888 | Huntington et al. | 248/310 X |
| 755,403 | 3/1904 | Sipe | 248/187 X |
| 2,313,115 | 3/1943 | Allen et al. | 248/310 X |
| 2,461,256 | 2/1949 | Black | 248/231.6 X |
| 2,679,121 | 5/1954 | Hoofer | 248/316.4 X |
| 3,313,506 | 4/1967 | Bauchard | 248/311.2 X |
| 3,380,698 | 4/1968 | Goldberg et al. | 248/231.4 X |
| 4,118,002 | 10/1978 | Bartlett | 248/310 X |
| 4,378,100 | 3/1983 | Minozzi et al. | 248/173 X |
| 5,054,729 | 10/1991 | Nogi | 248/231.4 X |

Primary Examiner—Karen J. Chotkowski
Attorney, Agent, or Firm—Allegretti & Witcoff, Ltd.

[57] ABSTRACT

An adjustable mounting assembly for mounting a bird bath bowl or other object to a wide variety of base types, shapes and sizes. The adjustable bracket assembly includes components that can be assembled to one another so as to create a variety of embodiments, enabling a bird bath bowl, for example, to be mounted to a wide variety of base types, base shapes and base sizes. Bracket members which attach to a base may be adjustably secured to a center mounting plate, whereby the bracket members may be adjustably extended to various radial lengths. The adjustable bracket members may also be connected together without use of the plate so as to accommodate a variety of other base types, including railings.

7 Claims, 3 Drawing Sheets

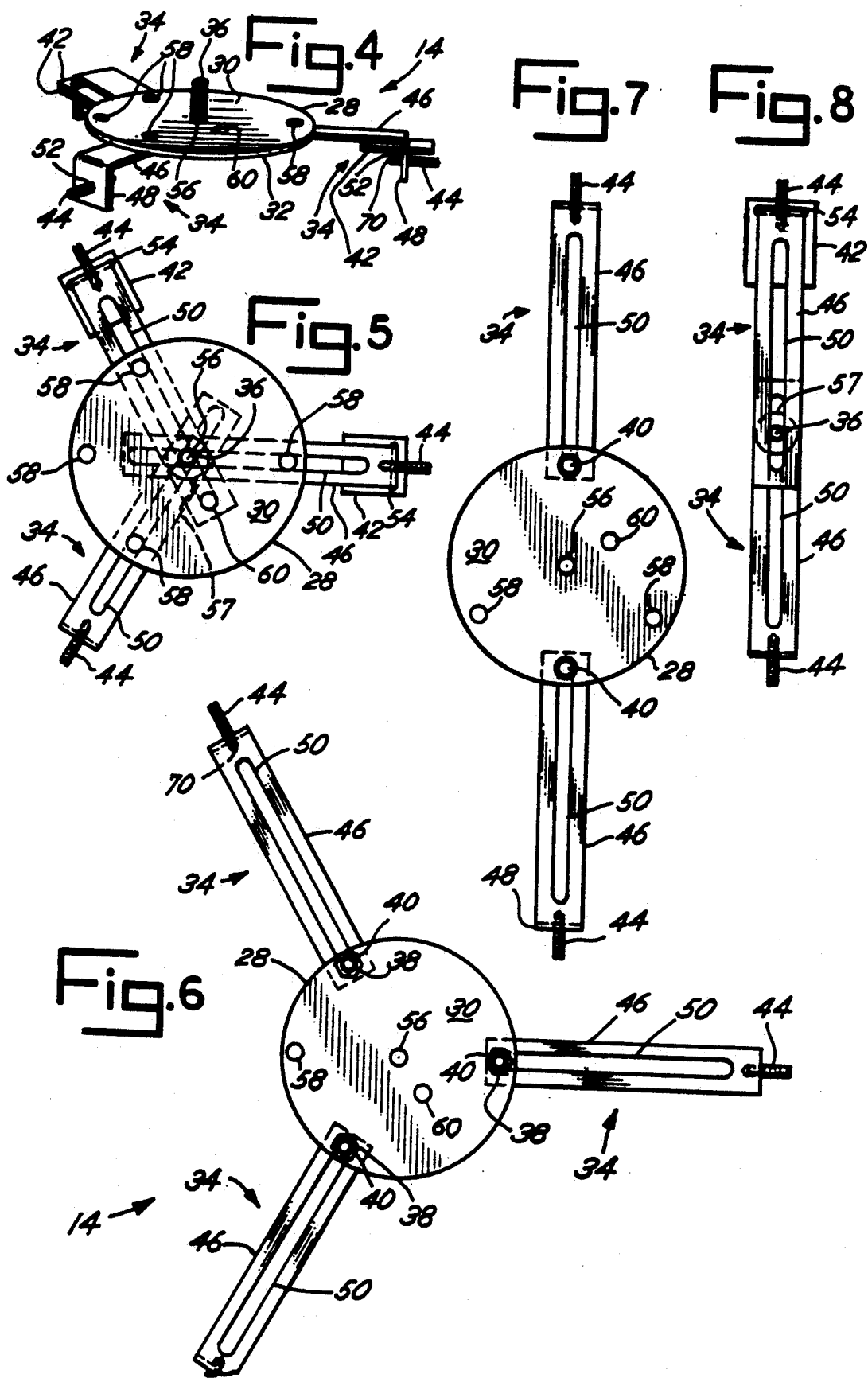

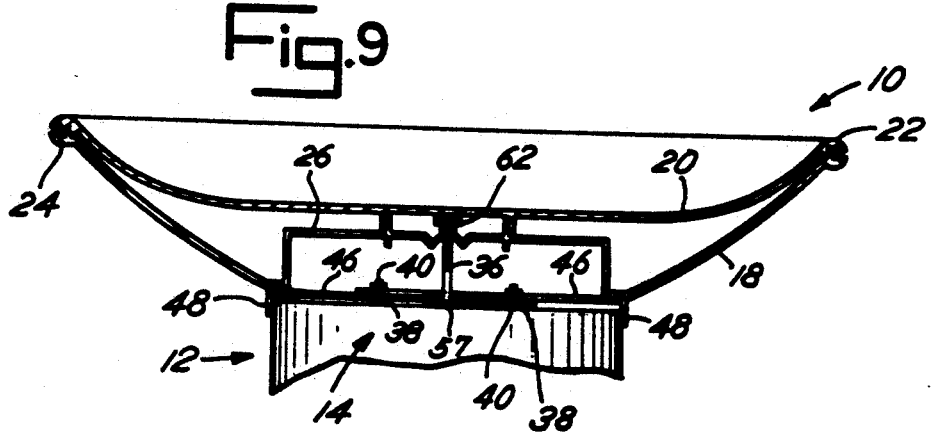
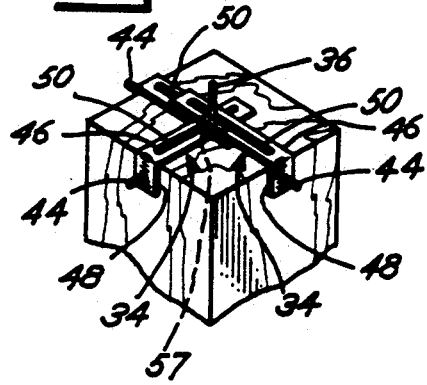
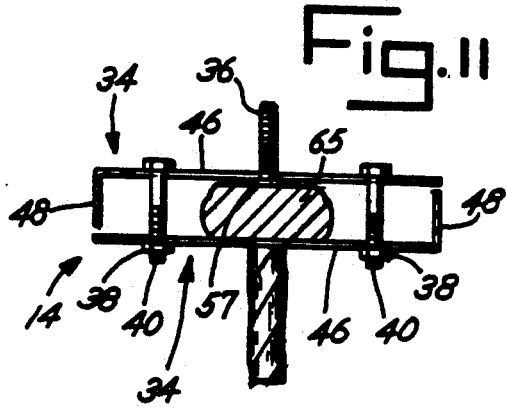
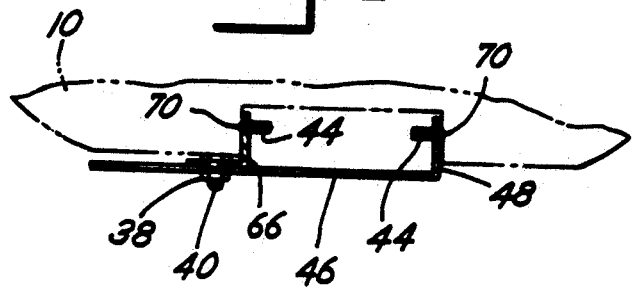

ADJUSTABLE MOUNTING ASSEMBLY

BACKGROUND OF THE INVENTION

This invention relates to an adjustable mounting assembly and, more particularly, an adjustable mounting assembly for a bird bath.

Prior patents may show one or more features of the present invention, but they do not disclose the unique combination of parts comprising the adjustable mounting assembly adapted for a wide range of uses.

Cullinan U.S. Pat. No. 2,250,361 discloses a portable holder which can be adapted to support objects of various shapes. The holder in Cullinan does not adjustably attach to the surface upon which it rests. The present invention, in contrast, provides means for adjustably securing an object to a variety of base shapes and sizes.

Koch U.S. Pat. No. 3,178,142 discloses a removable garbage can support which is inserted into the ground. The support slightly elevates the garbage can above ground level. Unlike the Koch reference, the present invention is directed towards securing objects, such as bird bath bowls, to a variety of bases.

Dieleman U.S. Pat. No. 4,630,569 discloses a bird bath containing a self-cleaning apparatus. Although the Dieleman bird bath comprises a bowl and pedestal, the reference fails to disclose any means for adjustably securing the bowl to a variety of bases.

Jones U.S. Pat. No. 3,648,659 and Liff U.S. Pat. No. 4,640,226 both disclose a bird bath with a heating apparatus. While each of these references disclose a means for attaching a bird bath bowl to a base, they do not disclose any means for adjustably securing a bowl to a variety of base types, base shapes, and base sizes.

SUMMARY OF THE INVENTION

The present invention pertains to an adjustable mounting assembly, the components of which can be combined in many different ways to accommodate a large variety of base sizes, shapes and types. While all of the components can be used together to create certain embodiments of the adjustable mounting assembly, other embodiments can be created by combining select components. This enables the adjustable mounting assembly to adapt to many different types of bases. Furthermore, each embodiment can be adjusted to accommodate a wide variety of base sizes. As a result, the adjustable mounting assembly permits the bird bath bowl or similar device to be mounted to a large assortment of base types, base shapes and base sizes.

Accordingly, an object of the invention is to provide an adjustable mounting assembly which overcomes the deficiencies of prior mounting assemblies and accommodates a large variety of base types, shapes, and sizes.

Another object of the invention is to simplify the means for attaching the bowl of a bird bath to the base so that the bowl portion of the bird bath may be easily removed and reattached to the base. This will make routine cleaning and storage of the bowl portion easy.

These and other features, objects and advantages of the present invention will be made more apparent from the following more detailed description of the invention, taken in conjunction with the accompanying drawing, which forms an integral part thereof.

BRIEF DESCRIPTION OF THE DRAWING

There is shown in the drawing presently preferred embodiments of the present invention, wherein like numerals in the various views refer to like elements and wherein:

FIG. 4 is a perspective view of another embodiment of the adjustable mounting assembly;

FIG. 5 is a top view of the adjustable mounting assembly of FIG. 4;

FIG. 6 is a top view of the embodiment of the adjustable mounting assembly of FIG. 4, with adjustable bracket members in a fully extended position;

FIG. 7 is a top view of a third embodiment of the adjustable mounting assembly;

FIG. 8 is a top view of a fourth embodiment of the adjustable mounting assembly;

FIG. 9 is a cross-sectional side view of a bird bath, including a bowl, a fifth embodiment of the adjustable mounting assembly and a base;

FIG. 10 is a perspective view of a sixth embodiment of the adjustable mounting assembly;

FIG. 11 is a cross-sectional side view of a sixth embodiment of the adjustable mounting assembly;

FIG. 12 is a cross-sectional side view of a seventh embodiment of the adjustable mounting assembly;

FIG. 13 is a perspective view of an eighth embodiment of the adjustable mounting assembly.

DESCRIPTION OF THE PREFERRED EMBODIMENTS

Figure 1:
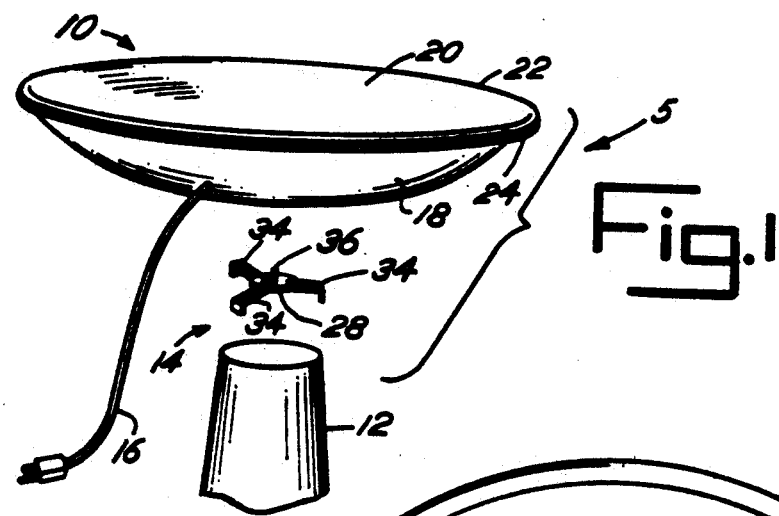
FIG. 1 is an exploded perspective view of a bird bath, including a heated bowl, an adjustable mounting assembly and a base.
Figure 2:
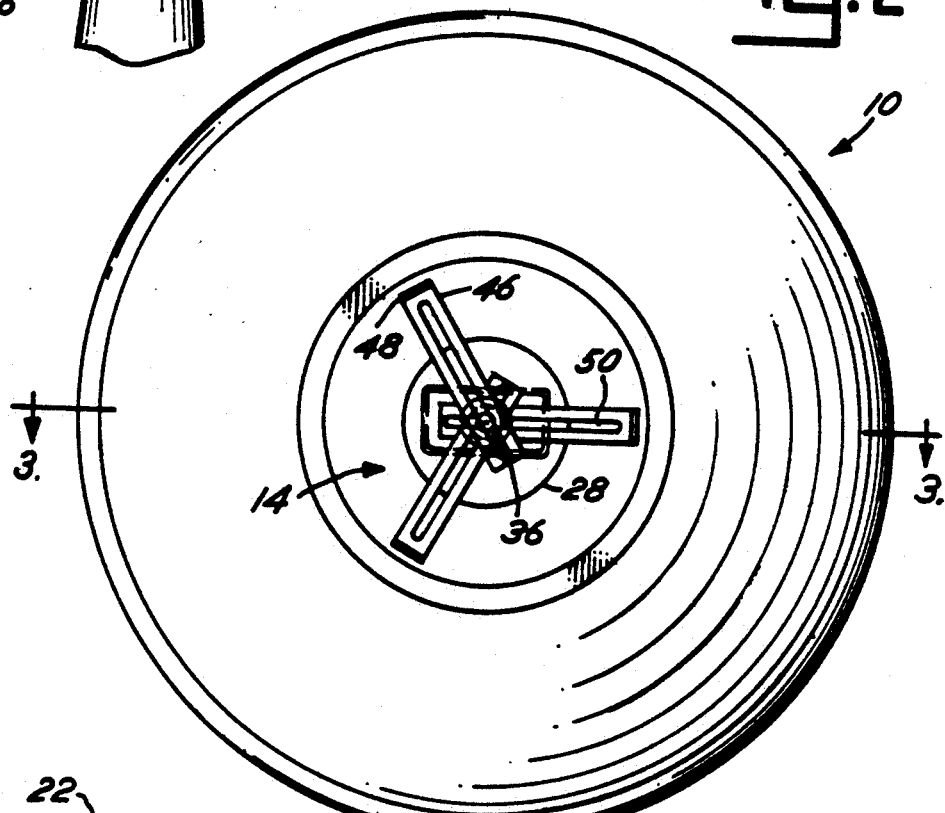
FIG. 2 is a bottom view of the bird bath bowl and adjustable mounting assembly.

Referring now to FIGS. 1-6 of the drawing, reference character 5 generally designates a bird bath having a bowl 10, a base 12 and an adjustable mounting assembly 14 for attaching the bowl 10 to the base 12.

The bowl 10 may be of any desired shape capable of retaining water therein and may be constructed with any suitable material such as, for example, plastic. If desired, the bird bath 5 can have means for heating the bowl 10. FIG. 1 illustrates an electrical cord 16 which could be used to power the heating means, for example a resistive heating element within bowl 10.

While many different sizes and styles of bowls may be designed to cooperate with the adjustable mounting assembly 14, the bowl 10 illustrated in FIGS. 1-3, and 9 is constructed in two separate halves, a lower half 18 and an upper half 20. The upper half 20 of the bowl 10 is shallow and level in the center. The lower half 18 of the bowl 10 is deeper than the upper half 20, and has a recess 26 in the center to conceal the adjustable mounting assembly 14 once mounting is complete.

The base 12 may be of many different varieties. Included among them are many sizes and shapes of railings, posts, and free-standing pedestals. It is even possible to configure the adjustable mounting assembly 14 to mount objects to flat surfaces.

Preferably, a complete adjustable mounting assembly 14 comprises a plate 28 having a top side 30 and a bottom side 32, at least three adjustable bracket members 34, a center mounting bolt 36 for attaching an object to be mounted to the adjustable mounting assembly 14, connecting means comprising a slot nut 38 and slot bolt 40 for adjustably securing the adjustable bracket members 34 to each other or to the plate 28, shims 42 which can be added to the adjustable bracket members 34 in situations where leveling of the adjustable mounting assembly 14 is required, and screws 44 for attaching at least one of the adjustable bracket members 34 to a base 12. While all of these elements can be used together, as illustrated in FIGS. 1-6, it is also consistent with the invention to use selected components to create an embodiment specifically adapted to a particular type of base 12, as evidenced in FIGS. 7-13.

The adjustable mounting assembly 14 and components thereof may be composed of any suitable material or combination of materials. In the preferred embodiment, the entire adjustable mounting assembly 14 is metallic in order to provide a satisfactory amount of strength and rigidity to the mount.

The adjustable mounting brackets 34 are complementary in configuration with the plate 28 to enable sliding motion of a bracket 34 with respect to the plate 28 for facilitating adjustment, as will be described more fully hereafter.

The adjustable bracket members 34 preferably comprise a main elongated planar portion 46 and a projecting portion 48 extending therefrom at an angle. As seen in FIGS. 4 and 5, the projecting portion 48 is disposed at generally a right angle with respect to planar portion 46. Both portions of the adjustable bracket member 34 are of sufficient thickness to provide the necessary strength and rigidity to the adjustable mounting assembly 14 to support a bowl 10 on a base 12.

The elongated planar portion 46 of each of the adjustable bracket members 34 has a slot 50 centrally located along the longitudinal axis for enabling radial inward and outward positioning of an adjustable mounting bracket 34 with respect to plate 28. Slot 50 is wide enough to receive a center mounting bolt 36 or a slot bolt 40, to adjustably attach the adjustable bracket member 34 to the plate 28 or to another adjustable bracket member 34. The length of the slot 50 is a substantial portion of the length of the elongated planar portion 46 of the adjustable bracket member 34. An internally threaded aperture 52 located substantially in the center of the projecting portion 48 of the adjustable bracket member 34 cooperates with externally threaded screw 44 which passes in either direction through the aperture 52 and is disposed along an axis that is generally parallel to the elongated planar portion 46. The screw 44 is thereby adjustably retained in aperture 52 for the purpose of permitting mounting onto different sizes and shapes of bases.

Figure 3:
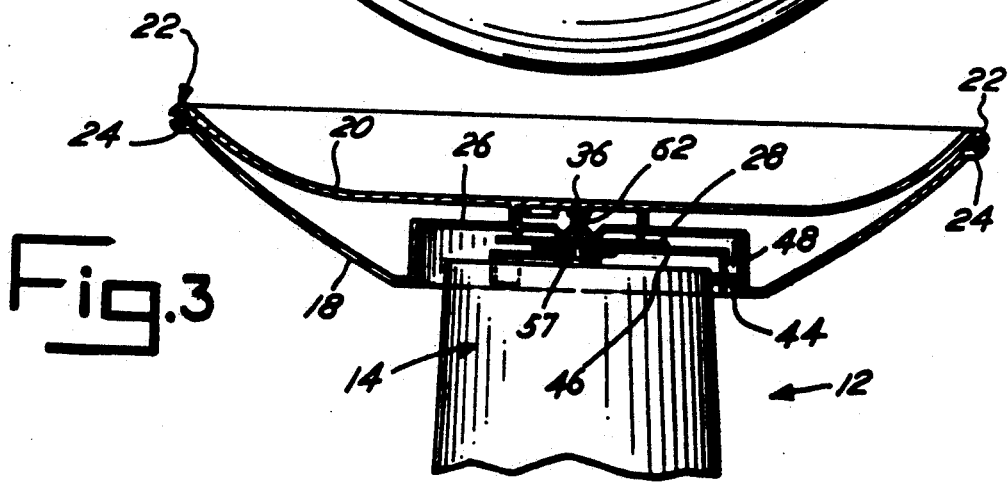
FIG. 3 is a side elevation of the bird bath taken generally on line 3—3 of FIG. 2.

The screws 44 which pass through the apertures 52 located in the projecting portions 48 of the adjustable bracket members 34 are intended to affix the adjustable mounting assembly 14 to either the base 12, as best illustrated in FIGS. 3 and 10, or to affix the adjustable mounting assembly 14 to the bowl 10, as illustrated in FIG. 12. Preferably each adjustable bracket member 34 is capable of retaining a screw 44 for this purpose, although it is not required that all adjustable bracket members 34 be secured to the base 12. The tip 53 of the preferred screw 44 is conical to enable penetration into the base 12. A rubber-tipped screw can be used when penetration into the base 12 or mounting object is either not desired or not possible.

When a particular embodiment of the adjustable mounting assembly 14 requires that the adjustable bracket members 34 overlap one another, as illustrated in FIGS. 2-5, 8, 9, 10 for example, the adjustable bracket members 34 may need to be built-up to level the mounting assembly 14 on the base 12. Shims 42 can be attached to the adjustable bracket members 34 to level the adjustable mounting assembly 14. The shims 42 are particularly useful when the adjustable bracket members 34 are the only means for supporting the adjustable mounting assembly 14, as would be the case, for example, when the base 12 is an open-ended, hollow cylinder resting upright on one of its ends.

The shims 42 are constructed from the same material as are the adjustable bracket members 34, for example, steel, and they are the same thickness as the adjustable bracket members 34. The shims 42 are slightly wider than the adjustable bracket members 34 and approximately one-quarter of the length of the elongated planar portion 46 of the adjustable bracket member 34. At one end of the shim 42 is a slot 54, the dimensions of which are slightly larger than the width and thickness of the adjustable bracket member 34. As a result, the shim 42 may pass over either end of the adjustable bracket member 34 and be slid into its final position on the underside of the elongated planar portion 46 of the adjustable bracket member 34, as shown in FIG. 4. Multiple shims 42 can be stacked on the same adjustable bracket member 34 when necessary to completely level the adjustable mounting assembly 14.

The plate 28 is shown to be circular and is of sufficient thickness to provide the necessary strength and rigidity to the adjustable mounting assembly 14. Located in the center of the plate 28 is a center aperture 56. The center aperture 56 is large enough to allow a center mounting bolt 36 to pass from the bottom side 32 of the plate 28 through to the bowl 10 of the bird bath 5, with the head 57 of the center mounting bolt 36 remaining on the bottom side 32 of the plate 28.

Four identical apertures 58 are located in plate 28 adjacent the perimeter. Three of the apertures are equidistantly spaced from one another on the plate 28, and are located on a uniform radius from the center of the plate 28. Also located on the uniform radius is the fourth aperture, which is spaced directly across from one of the three equidistantly-spaced apertures, and equidistantly spaced between the remaining two apertures. These four apertures 58 are large enough to receive a slot bolt 40. Connecting means each comprising a slot nut 38 and a slot bolt 40 secure the adjustable bracket members 34 to the plate 28 in a selected adjusted position.

Also located on the plate 28 is a dimple or projection 60 which protrudes on the bottom side of the plate 32. The dimple 60 is sized to fit inside the slot 50 of one of the adjustable bracket members 34. The dimple 60 is intended to prevent the plate 28 from turning, with respect to the adjustable bracket members 34, in the embodiment of the adjustable bracket assembly shown in FIGS. 2, 3 and 5. Since the plate 28 in this embodiment is attached to the adjustable bracket members 34 through only a single center mounting bolt 36 located in the center of the plate 28, the plate 28 would be able to rotate relative to the adjustable bracket members 34 without this dimple 60.

As shown in FIG. 5, one adjustable bracket member 34 is positioned against the bottom side 32 of the plate 28 so that both the center aperture 56 and the dimple 60 align with the slot 50 of the adjustable bracket member 34. The protrusion or dimple 60 extends into the slot 50 of this one adjustable bracket member 34, thus preventing the rotation of the plate 28 relative to the adjustable bracket member 34.

The dimple 60 is best located along a diameter line of the circular plate 28 which passes through one of the apertures 58 that are equidistantly-spaced around the circumference of the plate 28. This will permit the slot 50 of the adjustable bracket member 34 adjacent to the bottom of the plate 28 to simultaneously align with the dimple 60, the center aperture of the plate 28, and an aperture 58 at the edge of the plate 28. It will be understood that if needed in a particular application, connecting means comprising, for example, a slot bolt 40 may pass commonly through an aperture 58 and slot 50 of an adjustable bracket member 34 before engaging with a slot nut 38, for additionally securing the adjustable bracket members 34 to the plate 28.

The adjustable mounting assembly 14 includes means for attaching a bowl 10 to the adjustable mounting assembly 14. In several of the embodiments of the assembly, center mounting bolt 36 passes upwardly through the center aperture in the plate 56, or slot 50 in the adjustable bracket member 34, and then into an internally threaded channel 62 depending from the lower half 18 of the bowl 10.

In several embodiments of the adjustable mounting assembly 14, the head 57 of the center mounting bolt 36 rests on the base 12 (see FIGS. 3, 9, 10, and 11). As a result, the head 57 of the center mounting bolt 36 is often a point of support for the adjustable mounting assembly 14. Therefore, the head 57 of the center mounting bolt 36 is preferably thin and flat and has a surface area large enough to stabilize the adjustable mounting assembly 14.

FIGS. 12 and 13 illustrate alternative methods for attaching the bowl 10 to the adjustable mounting assembly 14. In these configurations, screws 44 pass through apertures 52 in the projecting portions 48 of the adjustable bracket members 34 before securing to the bowl 10.

The plate 28 may be used alone to permanently mount the bird bath bowl 10 to any base 12 with a flat surface. The center mounting bolt 36 for attaching the plate 28 to the bowl 10 can pass from the bottom side 32 of the plate 28 through the aperture 56 located in the center of the plate 28, while bolts or screws can pass from the top side 30 of the plate 28 through the edge apertures 58 and into the flat surface of the base 12.

The plate 28 can also be used in conjunction with two or more of the adjustable bracket members 34. Several embodiments are illustrated in FIGS. 1-7. The adjustable bracket members 34 can be attached to the plate 28 with a center mounting bolt 36 that passes through an opening commonly created by the overlapping slots 50 of the overlapping adjustable bracket members 34 before passing through the aperture 56 in the center of the plate 28, as illustrated in FIGS. 2-5. This embodiment can accommodate bases 12 having a small diameter.

Another way in which an adjustable bracket member 34 can be adjustably secured to the plate 28 is by using a slot bolt 40 that passes through the slot 50 of the adjustable bracket member 34 and through an edge aperture 58 on the plate 28, as illustrated in FIGS. 6 and 7. This embodiment can accommodate a base 12 of larger dimensions.

Use of the plate 28 is not mandatory, however. Adjustable bracket members 34 alone can be combined to create other embodiments, as illustrated in FIGS. 8-13. The adjustable bracket members 34 can be tied and secured together using the center mounting bolt 36 (FIGS. 8 and 10), connecting means comprising a slot nut 38 and slot bolt 40 (FIGS. 11-13), or a combination thereof (FIG. 9).

FIG. 11 illustrates how two adjustable bracket members 34 can be combined to create an adjustable mounting assembly 14 capable of mounting objects to a railing 65. In this embodiment, one adjustable bracket member 34 is rotated and inverted with respect to the other adjustable bracket member 34, and together the adjustable bracket members 34 clamp around the top and bottom sides of the railing 65. Connecting means comprising two slot nuts 38 and two slot bolts 40 are used to hold the adjustable bracket members 34 together. Each slot bolt 40 extends commonly through the slots 50 of both adjustable bracket members 34. The head 57 of the center mounting bolt 36 rests against the top surface of the base 12, and passes through the slot 50 of the adjustable bracket member 34 that rests on the top of the base 12.

FIGS. 12 and 13 illustrate how one adjustable bracket member 34 can be used in conjunction with another adjustable bracket member 34, or a smaller adjustable bracket member 66, to create an adjustable mounting assembly 14 suitable for mounting small objects or accommodating a base 12 of smaller dimensions. The smaller adjustable bracket member 66 can substitute an aperture 68 for the slot 50 of the other adjustable bracket members 34. The diameter of the aperture 68 is equivalent to the width of the slots 50 in the other adjustable bracket members 34.

In all of these embodiments, the slot bolt 40 passing through a slot 50 on an adjustable bracket member 34 can be loosened, allowing the adjustable bracket member 34 to moved along its slot 50 to various positions before the slot bolt 40 is tightened. As a result, the adjustable mounting assembly 14 can accommodate a wide range of base 12 sizes.

It is also consistent with the present invention to package either some or all of the above-identified components of the adjustable mounting assembly together, in combination, as a single article of manufacture.

While preferred embodiments of the present invention have been depicted and described, it will be appreciated by those skilled in the art that many modifications, substitutions, and changes may be made thereto without departing from the true spirit and scope of the invention as defined in the appended claims.

What is claimed is:

1. An adjustable mounting assembly to be used in mounting an object to a selected base, the adjustable mounting assembly comprising a plate having apertures on a uniform radius from a substantially center point of the plate, means for affixing an object to be mounted to the plate at the substantially center point of the plate, at least two adjustable bracket members, each adjustable bracket member having a slot centrally located along a longitudinal axis of the adjustable bracket member and extending for a distance that is at least substantially equal in length to the uniform aperture radius, means for adjustably securing each adjustable bracket members to the plate, and means for affixing at least one of the adjustable bracket members to a base.

2. An adjustable mounting assembly as recited in claim 1, wherein each of the adjustable bracket members is an angle bracket having an elongated planar portion and a projecting portion bent at an angle with respect to the elongated planar portion.

3. An adjustable mounting assembly as recited in claim 2, wherein at least one of the adjustable bracket members has an aperture in the projecting portion and wherein the means for affixing at least one of the adjustable bracket members to a base is a screw which passes in the direction of the base through the aperture in the projecting portion of the adjustable bracket member.

4. An adjustable mounting assembly as recited in claim 1, wherein the plate includes a top side and a bottom side and the plate has a dimple protruding on the bottom side of the plate for engagement within a slot of an adjustable bracket member.

5. An adjustable mounting assembly as recited in claim 1, further comprising at least one shim removably engaging an adjustable bracket member.

6. An adjustable mounting assembly to be used for mounting an object to a selected base, the adjustable mounting assembly comprising a plate, means for affixing the object to the plate, at least two adjustable bracket members adjustably mounted to the plate, means for affixing at least one of the adjustable bracket members to a base, and at least one shim removably engaging an adjustable bracket member.

7. An adjustable mounting assembly to be used for mounting an object to a selected base, the adjustable mounting assembly comprising at least two adjustable bracket members, each adjustable bracket member having an elongated slot centrally located along a longitudinal axis of the adjustable bracket member, means passing through the elongated slots of the adjustable bracket members for adjustably securing the adjustable bracket members to one another in an overlapping relationship, means passing through the elongated slot of at least one adjustable bracket member for affixing an object to be mounted to the adjustable mounting assembly, means for affixing at least one of the adjustable bracket members to a base, and at least one shim removably engaging an adjustable bracket member.

* * * * *